(12) United States Patent
Du et al.

(10) Patent No.: US 10,932,060 B2
(45) Date of Patent: Feb. 23, 2021

(54) SCREEN COMPONENT AND MOBILE TERMINAL

(71) Applicant: BEIJING XIAOMI MOBILE SOFTWARE CO., LTD., Beijing (CN)

(72) Inventors: Na Du, Beijing (CN); Youhong Cheng, Beijing (CN); Lianwen Shan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/695,156

(22) Filed: Nov. 25, 2019

(65) Prior Publication Data
US 2020/0413200 A1 Dec. 31, 2020

(30) Foreign Application Priority Data
Jun. 27, 2019 (CN) .......................... 201910568680.X

(51) Int. Cl.
*H04R 15/00* (2006.01)
*H04M 1/02* (2006.01)
(Continued)

(52) U.S. Cl.
CPC ............ *H04R 15/00* (2013.01); *H04M 1/026* (2013.01); *H04R 1/025* (2013.01); *H04R 9/025* (2013.01);
(Continued)

(58) Field of Classification Search
CPC ........ H04R 15/00; H04R 1/025; H04R 9/025; H04R 9/06; H04R 2499/11; H04R 2499/15; H04M 1/026
See application file for complete search history.

(56) References Cited

U.S. PATENT DOCUMENTS

2006/0276225 A1* 12/2006 Suzuki ..................... G08B 6/00
455/557
2016/0337757 A1* 11/2016 Ozasa .................. H04R 17/005
(Continued)

FOREIGN PATENT DOCUMENTS

CN  109714683 A  5/2019
CN  109842701 A  6/2019
(Continued)

OTHER PUBLICATIONS

European Search Report in the European application No. 19212565.6, dated Jan. 17, 2020.
(Continued)

*Primary Examiner* — Andrew L Sniezek
(74) *Attorney, Agent, or Firm* — Syncoda LLC; Feng Ma

(57) ABSTRACT

A screen component includes a screen body and at least one vibration assembly. The vibration assembly includes a movable member made from a giant magnetostrictive material and at least one coil surrounding the movable member, and the movable member is partially attached to the screen body. The at least one coil forms a magnetic field when the coil is supplied with an input current. The movable member deforms under the effect of the magnetic field. The magnetic field changes according to a change in parameter of the input current. A deformation amount of the movable member changes according to the change in magnetic field of the coil to drive the screen body to vibrate to output corresponding sound information by the screen component.

19 Claims, 7 Drawing Sheets

(51) Int. Cl.
*H04R 1/02* (2006.01)
*H04R 9/02* (2006.01)
*H04R 9/06* (2006.01)

(52) U.S. Cl.
CPC ............ *H04R 9/06* (2013.01); *H04R 2499/11* (2013.01); *H04R 2499/15* (2013.01)

(56) References Cited

U.S. PATENT DOCUMENTS

2018/0317000 A1 11/2018 Ham et al.
2019/0268681 A1 8/2019 Masuda et al.
2020/0043301 A1* 2/2020 Cruz-Hernandez ..... G10L 15/26

FOREIGN PATENT DOCUMENTS

| JP | 2007110382 A | 4/2007 |
| KR | 20100081184 A | 7/2010 |
| WO | 2018123292 A1 | 7/2018 |

OTHER PUBLICATIONS

Rui Wang, et al. "Study on the Sound Radiation Characteristics of Panel Loudspeaker", May 2007.
Qiang Zhou, et al. "Study on Sensitivity of Giant Magnetostrictive Flat Panel Loudspeaker", Nov. 2015.

* cited by examiner

SCREEN COMPONENT AND MOBILE TERMINAL

CROSS-REFERENCE TO RELATED APPLICATION

This application claims priority to Chinese patent application No. 201910568680.X filed on Jun. 27, 2019, the disclosure of which is hereby incorporated by reference in its entirety.

BACKGROUND

A mobile terminal such as a mobile phone or a tablet computer plays an increasingly important role in daily life, and many designers also pay more and more attentions to user experiences in development of mobile terminals. For example, in order to meet a demand of high screen-to-body ratio that a user of a mobile phone pursues and to implement a seamless (e.g., "holeless") design of appearance of the mobile phone, a screen sound technology can be adopted for the mobile terminal to overcome the shortcoming of a conventional moving-coil speaker, that is, the conventional moving-coil speaker requires formation of a hole in a middle frame component of a mobile terminal to allow the sound output.

SUMMARY

The present disclosure relates generally to the field of electronic devices, and more specifically to a screen component and a mobile terminal.

According to a first aspect of embodiments of the present disclosure, a screen component is provided, which can include a screen body and at least one vibration assembly. The vibration assembly can include a movable member made from a giant magnetostrictive material and at least one coil surrounding the movable member. A part of the movable member is in contact with the screen body.

The at least one coil forms a magnetic field when the coil is supplied with an input current. The movable member deforms under the effect of the magnetic field. The magnetic field changes according to a change in parameter of the input current. A deformation amount of the movable member changes according to the change in the magnetic field of the coil to drive the screen body to vibrate to output corresponding sound information by the screen component.

According to a second aspect of the embodiments of the present disclosure, a mobile terminal is provided, which can include: a processor and a memory configured to store a processor executable instruction. The mobile terminal may further include the abovementioned screen component, and a coil may be in communication connection with the processor.

It is to be understood that the above general descriptions and the detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

Figure 1:
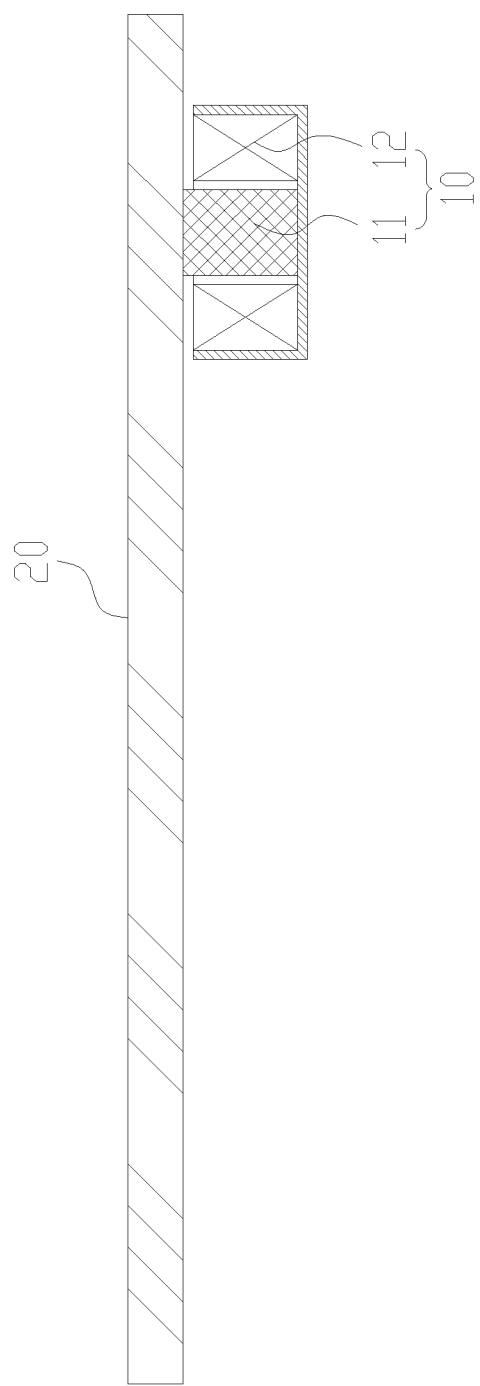
FIG. 1 is a sectional structure diagram of a screen component, according to some embodiments of the present disclosure.

List of reference symbols: Vibration assembly 10; movable member 11; coil 12; conduction member 13; protective cover 14; limiting portion 141; collar portion 142; magnetic shield cover 15; bottom wall 151; shielding wall 152; screen body 20; middle frame component 30; mobile terminal 40; processing component 41; memory 42; power component 43; multimedia component 44; audio component 45; Input/Output (I/O) interface 46; sensor component 47; communication component 48; and processor 49.

DETAILED DESCRIPTION

Reference will now be made in detail to exemplary examples, examples of which are illustrated in the accompanying drawings. The following description refers to the accompanying drawings in which the same numbers in different drawings represent the same or similar elements unless otherwise represented. The implementations set forth in the following description of exemplary examples do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific examples and not intended to limit the present disclosure. "A/an," "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms "first," "second," "third" and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining," depending on the context.

Typically, components configured to achieve the screen sound technology include a linear motor type exciter, a piezoelectric exciter, an electromagnetic suspension exciter or the like. However, when these components are applied to a mobile terminal, a sound effect in a low frequency band is poor and a user experience is influenced. These components are low in electromagnetic efficiency, low in efficiency of converting electromagnetic energy of the components into kinetic energy and slow in response. Fabrication processes for the components such as the piezoelectric exciter and the electromagnetic suspension exciter are complex and have an extremely high requirement on fitting accuracy, which causes low yield and high production cost.

Various embodiments disclosed herein can adopt a giant magnetostrictive material, e.g., a magnetostrictive material with an extremely great magnetostriction coefficient. Dimensional expansion and contraction of the giant magnetostrictive material may proportionally change along with an applied magnetic field, and the magnetostriction coefficient thereof is far greater than that of a conventional magnetostrictive material.

The giant magnetostrictive material can the following characteristics. (1) The magnetostriction coefficient of the giant magnetostrictive material is great, and is few tens times larger than that of a material such as Fe and Ni, and is 3 to 5 times larger than that of piezoelectric ceramics. (2) Energy conversion efficiency of the giant magnetostrictive material is 49% to 56%, while that of the piezoelectric ceramics is 23% to 52%. (3) An energy density of the giant magnetostrictive material is high, and is 400 to 800 times larger than that of Ni and is 12 to 38 times larger than that of the piezoelectric ceramics. (4) Response time for formation of a magnetostrictive effect is short, and a stress effect is formed almost at the same time of magnetization. (5) Compressive strength and a bearing capacity of the giant magnetostrictive material are high, and thus the giant magnetostrictive material can work in a strong pressure environment. (6) A working frequency band is wide, and the giant magnetostrictive material is applied not only to a low frequency below hundreds of Hz, but also to an ultrahigh frequency.

FIG. 1 is a sectional structure diagram of a screen component, according to some embodiments of the present disclosure.

Figure 2:
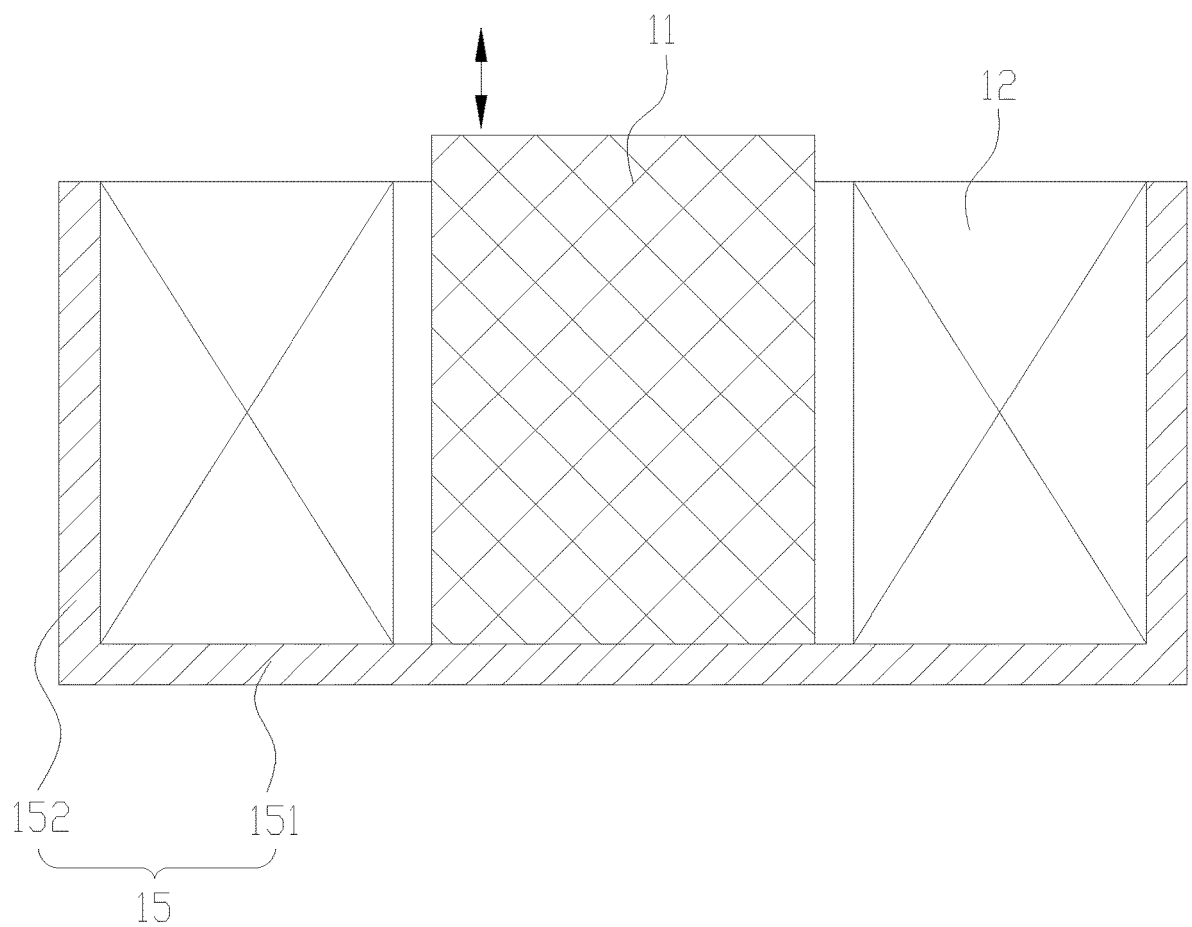
FIG. 2 is a sectional structure diagram of a vibration assembly of which a movable member vibrates under the effect of a magnetic field of a coil, according to some embodiments of the present disclosure.

FIG. 2 is a sectional structure diagram of a vibration assembly 10 according to some embodiments of the present disclosure, in which a movable member 11 of the vibration assembly vibrates under the effect of a magnetic field of a coil 12.

As shown in FIG. 1 and FIG. 2, the screen component includes a screen body 20 and at least one vibration assembly 10, the vibration assembly 10 includes a movable member 11 made from a giant magnetostrictive material and at least one coil 12 surrounding the movable member 11. A part of the movable member 11 is in contact with the screen body 20. The at least one coil 12 forms a magnetic field when the coil 12 is supplied with an input current. The movable member 11 deforms under the effect of the magnetic field. The magnetic field changes according to a change in parameter of the input current. A deformation amount of the movable member 11 changes according to the change in the magnetic field of the coil 12 to drive the screen body 20 to vibrate to output corresponding sound information by the screen component.

The coil 12 generates the magnetic field when being energized. A parameter of the magnetic field changes according to a change in the current parameter, and the parameter of the magnetic field and the current parameter change synchronously. The screen component may be applied to an electronic device. In the electronic device, the coil 12 is electrically connected to an audio circuit portion of the electronic device such that the change in the current parameter of the coil 12 is consistent with a change in an audio frequency, and that amount of the expansion and contraction of the movable member 11 corresponds to the change in an audio frequency during the change of the magnetic field. The movable member 11 is in contact with a surface of the screen body 20. When amount of the expansion and contraction of the movable member 11 changes, the screen body 20 is elastically deformed under the effect of a thrust of the movable member 11 and vibrates according to the change in audio frequency, to enable the screen component to output corresponding sound information with a good sound output effect. A change direction of the expansion and contraction of the movable member 11 is a linear reciprocating expansion and contraction movement, the movement direction is stable, and the expansion and contraction can be controllable.

The movable member 11 made from the giant magnetostrictive material is telescopically deformed in an axial direction, to apply a thrust onto the screen body 20, and thus the screen body 20 is subjected to the strong thrust. The movable member 11 is approximately linearly deformed under the effect of the magnetic field of the coil 12, so that a size of the whole vibration assembly 10 may be reduced, overall layout of the screen component may be facilitated, and a stereoscopic effect of an output sound effect may be improved. The vibration assembly 10 directly acts on the screen body 20 and synchronously changes with a current signal output by an audio circuit portion, so that a sound output by the screen component is low in distortion and high in frequency response, and a user experience is improved. Moreover, the vibration assembly 10 is in directly contact with the screen body 20, so that an assembly requirement and a fit tolerance requirement are low, a product defective rate is reduced, and production cost is reduced.

The screen body 20 is elastically deformed under the effect of the thrust of the movable member 11, such that the screen body 20 vibrates and outputs the sound information. A contact position of the movable member 11 and the screen body 20 may be arranged according to a spatial layout requirement, and a deformation direction of the movable member 11 is at a preset angle with respect to the screen body 20, for example, the deformation direction of is at an angle of 45 degrees, 60 degrees, 85 degrees or 90 degrees with respect to the screen body. In some embodiments of the present disclosure, a deformation direction of the movable member 11 is perpendicular to the screen body 20 such that a deformation of the movable member 11 is the same as a deformation of the screen body 20, a sound distortion is low and a frequency response is high.

Figure 3:
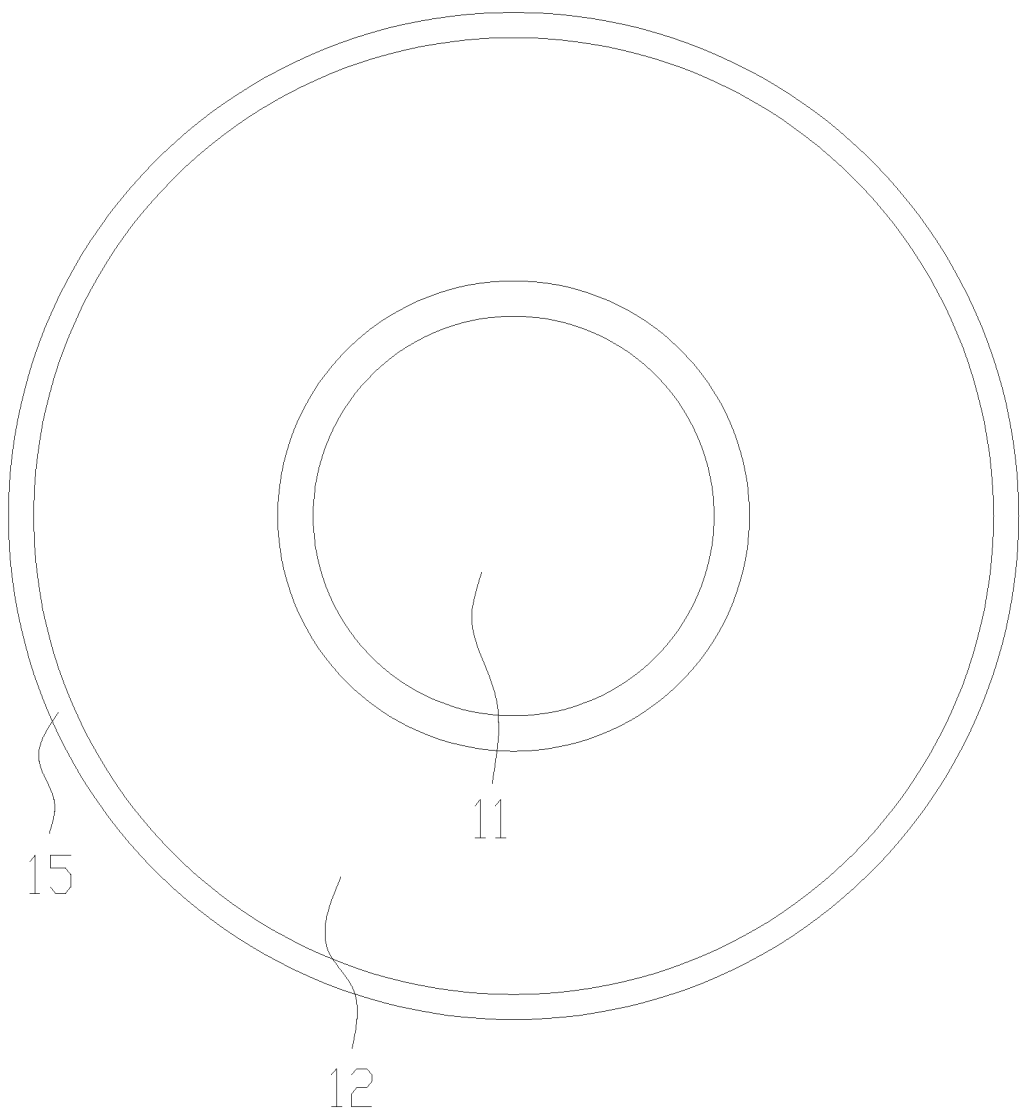
FIG. 3 is a top view of a circular vibration assembly, according to some embodiments of the present disclosure.

As shown in FIG. 2 and FIG. 3, in some embodiments of the present disclosure, the movable member 11 is positioned at a center of the coil 12. The coil 12 is in the form of an annular structure, to surround the movable member 11. The movable member 11 is positioned at the center of the coil 12 and is evenly subjected to the magnetic field in each direction, the deformation of the movable member 11 is concentrated in an axial direction, and thus an expansion and contraction direction may be well controlled. In some embodiments of the present disclosure, the movable member 11 is of a pillar structure, the contact position of the movable member with the screen body 20 is controllable, and positioning accuracy is high. For example, the movable member 11 may also be a pillar structure having a cylindrical section, prismatic section or another sectional shape. It is to be noted that a shape of the movable member 11 is not limited to a regular pillar structure and may also be another shape such as an irregular pillar structure with different sectional dimensions. One or more spaced vibration assemblies 10 are assembled on the screen body 20, so that a sound output position of the screen component may be flexibly adjusted and high design flexibility is ensured. Multiple vibration assemblies 10 spaced from each other are assembled on the screen body 20, so that an output range of the sound information may be extended, and a good sound output effect such as a good stereoscopic sound output effect may be achieved.

The movable member 11 may be directly abutted against the screen body 20 to thrust the screen body 20 to be elastically deformed and to vibrate. The movable member may also transmit a driving force to the screen body 20 through an intermediate member to thrust the screen body 20 to be elastically deformed and to vibrate. In some embodiments of the present disclosure, the vibration assembly 10 includes a conduction member 13 mounted at an output end of the movable member 11, and the conduction member 13 is in contact with the screen body 20 and thrusts the screen body 20 to be elastically deformed.

Figure 4:
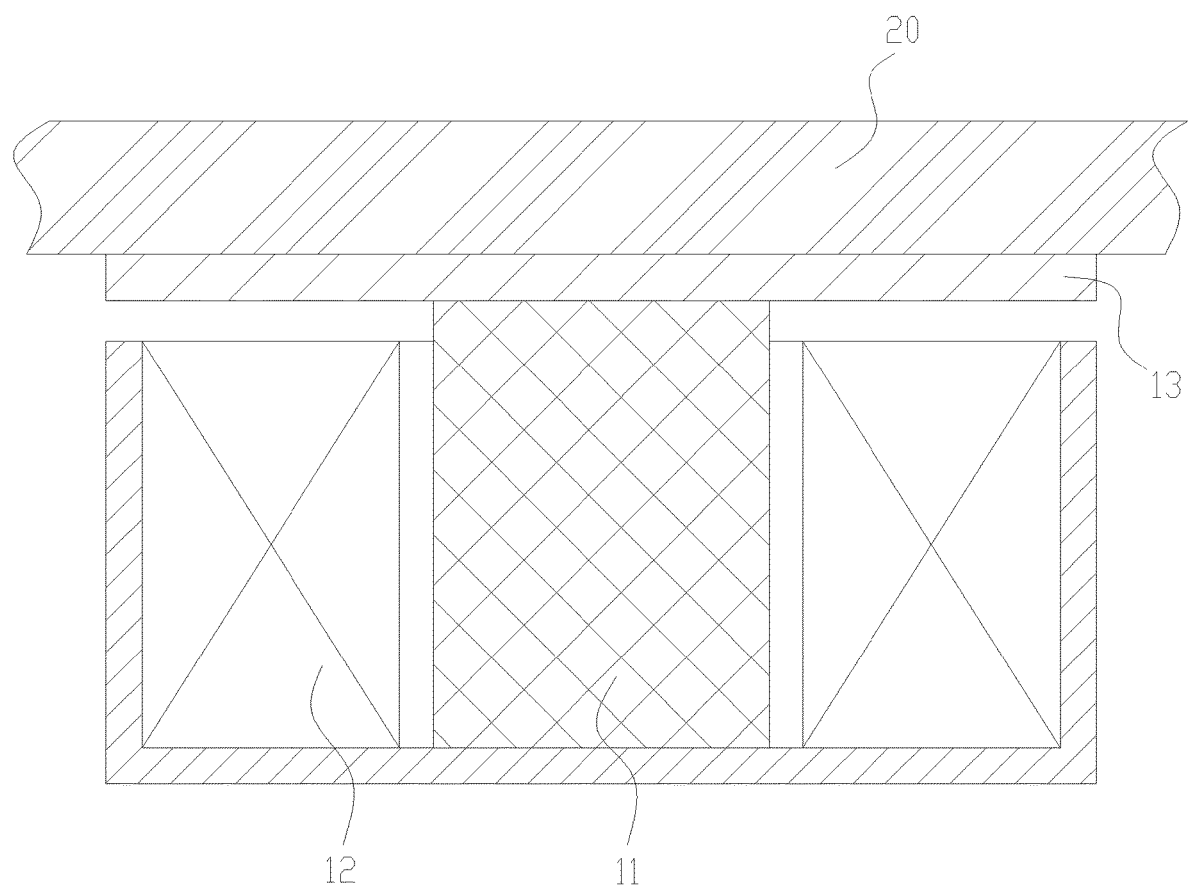
FIG. 4 is a sectional structure diagram of a vibration assembly with a conduction member, according to some embodiments of the present disclosure.

As shown in FIG. 1 and FIG. 4, the conduction member 13 is positioned between the screen body 20 and the movable member 11 to transmit the driving force as the intermediate structural member, so that an operating position and operating angle between the screen body 20 and the movable member 11 may be adjusted, and flexibility in spatial layout between the vibration assembly 10 and the screen body 20 may be improved. In some embodiments of the present disclosure, the conduction member 13 is configured to change a direction of an acting force of the vibration assembly 10, so as to be adapted to the spatial layout of the vibration assembly 10. For example, the conduction member 13 may be a wedge block moving structure, a hinge rotating mechanism or a connecting rod mechanism. In some embodiments of the present disclosure, the conduction member 13 is configured to change the contact position and contact area of the vibration assembly 10 and the screen body 20 to improve the sound effect output by the screen component and prolong service life of the screen component. In some embodiments of the present disclosure, a contact area of the conduction member 13 and the screen body 20 is larger than an area of the output end of the movable member 11.

The conduction member 13 is connected to the output end of the movable member 11 to ensure that the displacement of conduction member is same as the movable member. A contact area of the conduction member 13 and the screen body 20 is larger, so that concentration of the thrust on the screen body 20 is avoided, and evener stress is ensured. A contact area of the movable member 11 and the screen body 20 is enlarged by the conduction member 13, so that a vibration frequency of the screen body 20 may be reduced and improved, the screen body 20 may vibrate more stably, and the sound effect output by the screen component may be better.

The conduction member 13 is in contact with the screen body 20 and transmits the driving force transmitted by the movable member 11 to the screen body 20, to cause the screen body and the movable member to move synchronously. In some embodiments of the present disclosure, the conduction member 13 is glued to the screen body 20 through an adhesive, to attach the surface of the conduction member with the surface of screen body. The conduction member 13 is closely attached to the screen body 20 through the adhesive without any movement gap therebetween, so that the conduction member 13 and the screen body 20 are synchronously elastically deformed, and thus a wide deformation range and close contact is achieved.

In some embodiments of the present disclosure, the conduction member 13 is in the form of a plate structure, and the movable member 11 is connected to a center of the conduction member 13. The conduction member 13 is in the form of a thin-walled structure and may be gradually elastically deformed from the center to the periphery, and the deformation range is wide. In some embodiments of the present disclosure, the conduction member 13 is a circular plate structure, and the movable member 11 is connected to the center of the conduction member 13, such that the conduction member 13 is subjected to the same force in each direction. In some embodiments of the present disclosure, the conduction member 13 is in form of a square plate structure, and the movable member 11 is connected to an intersection of diagonals of the conduction member 13, such that the conduction member 13 is subjected to the force that is symmetrically distributed and even. The conduction member 13 is in form of the plate structure and may evenly transmit the driving force of the movable member 11 to the screen body 20 with a relatively large contact area, a transmission effect is good, the output sound information covers a wide frequency band, the sound distortion is low, and the frequency response is high.

Figure 5:
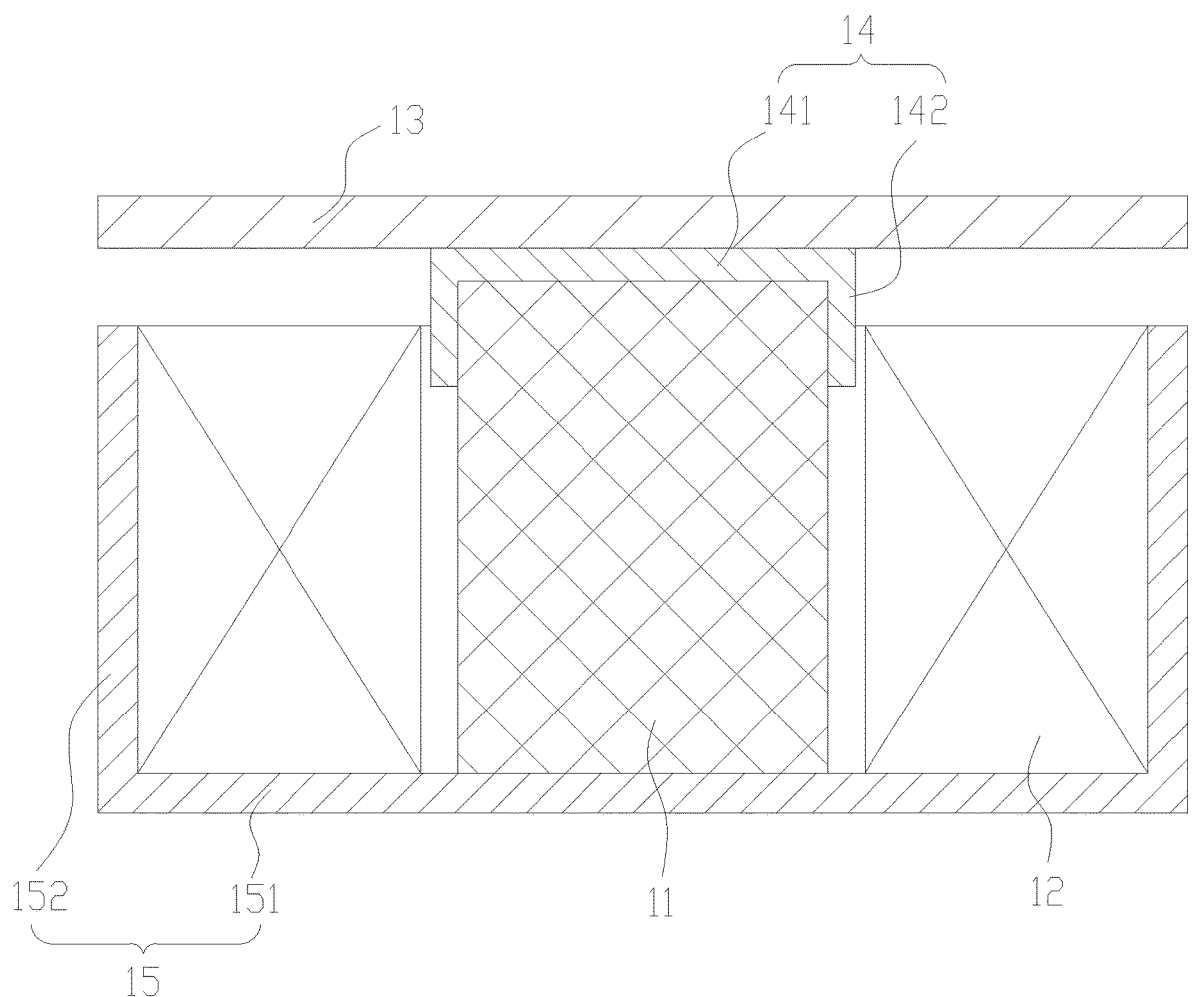
FIG. 5 is a structure diagram of a vibration assembly with a conduction member and a protective cover, according to some embodiments of the present disclosure.

As shown in FIG. 5, one side surface of the conduction member 13 is glued to the screen body 20, and the other side surface is connected with the movable member 11 to transmit the expansion and contraction of the movable member and the thrust generated by expansion and contraction movement to the screen body 20. The conduction member 13 is closely connected with the movable member 11 at a contact part of the movable member. In some embodiments of the present disclosure, the conduction member 13 is glued the movable member 11, so as to be fixed and form an integrated structure. In some other embodiments of the present disclosure, the vibration assembly 10 further includes a protective cover 14 fixedly connected to the conduction member 13, and the protective cover 14 is arranged to cover the movable member 11. The protective cover 14 is fixedly connected to the conduction member 13, and configured to limit a movement range of the movable member 11 to keep relative position between the movable member 11 and the conduction member 13 fixed. A range of the conduction member 13 subjected to the force is unified, and a limiting effect on the movable member 11 is good. In some embodiments of the present disclosure, the protective cover 14 is provided with a hollow limiting space, and the protective cover 14 is arranged to cover the movable member 11. The output end of the movable member 11 is limited in the limiting space to limit circumferential offset of the movable member 11 and achieve high positioning accuracy.

The protective cover 14 is fixedly connected to the conduction member 13 to form a whole structure. In some embodiments of the present disclosure, the protective cover 14 is detachably connected with the conduction member 13. The protective cover 14 and the conduction member 13 are arranged to be independent components, so that machining efficiency is improved. In some embodiments of the present disclosure, the protective cover 14 and the conduction member 13 are made into a whole structure by welding, adhesion through the adhesive and another machining process, and are high in connection firmness. In some embodiments of the present disclosure, the protective cover 14 is integrally formed with the conduction member 13. The protective cover 14 is formed at the conduction member 13 by an integral molding or over-molding process. The protective cover 14 and the conduction member 13 form a stepped structure, and the conduction member 13 is fixed to the screen body 20 and connected to the movable member 11 through the protective cover 14 in a limiting manner. The positioning accuracy is high, the transmission effect is good, and the output sound quality is high.

The protective cover 14 is arranged to cover the movable member 11 to limit the movement range of the movable member 11 and protect the movable member 11. In some embodiments of the present disclosure, the protective cover 14 includes a limiting portion 141 and a collar portion 142 surrounding the limiting portion 141. The movable member 11 is abutted against the limiting portion 141 and is limited in a region surrounded by the collar portion 142.

The collar portion 142 is an annular or tubular protrusion. The limiting portion 141 is positioned at one end of the collar portion 142 and closes at least part of an opening of the collar portion 142. The movable member 11 is inserted into the region surrounded by the collar portion 142 and abutted against the limiting portion 141, to ensure that the output end of the movable member 11 is limited and protected by the protective cover 14 and achieve stable overall performance of the movable member 11 and the good output effect.

In some embodiments of the present disclosure, at least a part of the protective cover 14 is inserted into a region enclosed by the coil 12 and spaced from the coil 12 by a preset distance. The movable member 11 is positioned in the region surrounded by the coil 12 and may elastically expands and contracts under the effect of the magnetic field of the coil 12. The protective cover 14 is arranged to encircle the output end of the movable member 11 and extend into the region surrounded by the coil 12. The protective cover 14 is spaced from the coil 12, so that the protective cover 14 may move relative to the coil 12 during an expansion and contraction process of the movable member 11, and thus the movement flexibility is high. The protective cover 14 extends into the region surrounded by the coil 12, so that the cooperation range of the protective cover 14 and the movable member 11 may be extended, and contact stability of the protective cover and the movable member may be improved.

In some embodiments of the present disclosure, there is a preset pressure between the protective cover 14 and the movable member 11 to keep the protective cover 14 in close contact with the movable member 11 without any movement gap therebetween, and achieve high synchronous movement performance. In some embodiments of the present disclosure, when the vibration assembly 10 is assembled to the screen body 20, a preset pressure is exerted between the screen body 20 and the vibration assembly 10, and the preset pressure is transmitted to the movable member 11 through the protective cover 14 to form the preset pressure between the movable member 11 and the protective cover 14 to implement close contact therebetween and high vibration synchronism.

Figure 6:
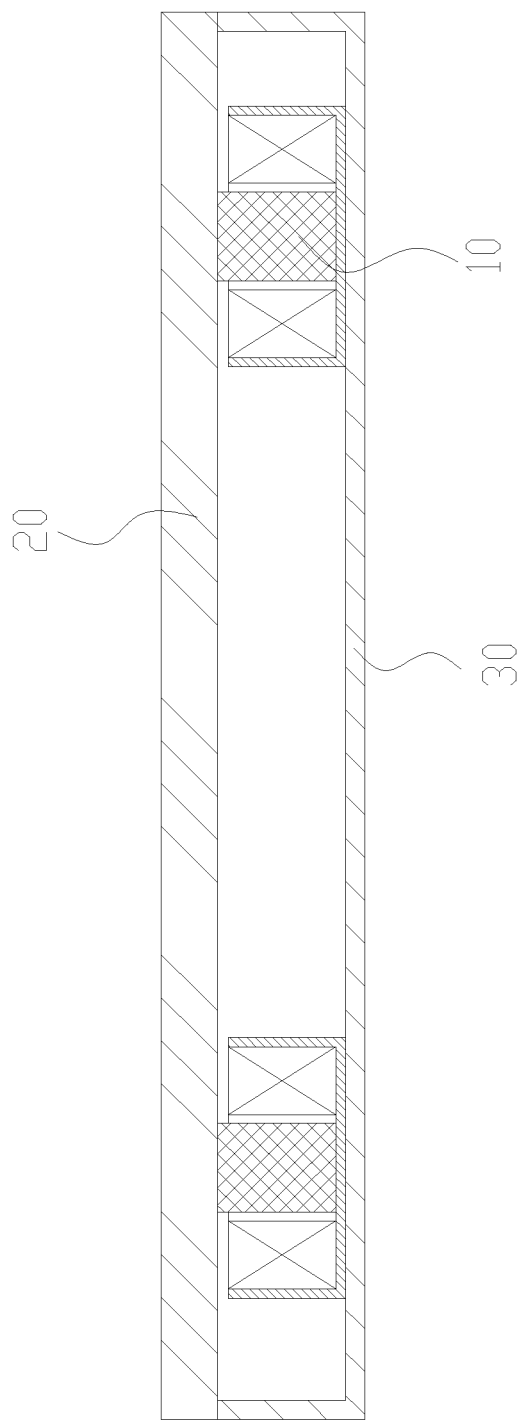
FIG. 6 is a structure diagram of a screen component mounted at a middle frame component, according to some embodiments of the present disclosure.

As shown in FIG. 5 and FIG. 6, relative position between the vibration assembly 10 and the screen body 20 are fixed, and the vibration assembly 10 is connected to the screen body 20 to output the sound information to the outside through the screen body 20. In some embodiments of the present disclosure, the vibration assembly 10 includes a magnetic shield cover 15 arranged to encircle coil 12, the magnetic shield cover 15 is configured to limit the relative position between the movable member 11 and the screen body 20. One end of the movable member 11 extends beyond the magnetic shield cover 15.

The magnetic shield cover 15 is in the form of a rigid structure, is arranged to encircle the coil 12 and limits a mounting position of the movable member 11. The magnetic shield cover 15 may be fixed to a fixed frame to keep the relative position between the vibration assembly 10 and the screen body 20 fixed. The movable member 11 is limited in the coil 12, one end of the movable member is blocked by the magnetic shield cover 15, while the other end extends out of the magnetic shield cover 15 and extends outwards to be abutted against the screen body 20 and the protective cover 14, to limit the expansion and contraction direction of the movable member 11. The direction of the movable member 11 may be controlled well.

In some embodiments of the present disclosure, the magnetic shield cover 15 is made from a magnetized steel material to shield the range of the magnetic field of the coil 12, so as to avoid influence of the magnetic field generated by the coil 12 on a region outside the magnetic shield cover 15 and make the range of the magnetic field controllable. The magnetic field acts on the movable member 11 in a concentrated manner to ensure that the movable member 11 may accurately expand and contract according to a change in the magnetic field, and thus high sensitivity is achieved.

In some embodiments of the present disclosure, the magnetic shield cover 15 includes a bottom wall 151 and a shielding wall 152 surrounding the bottom wall 151, and the coil 12 and the movable member 11 are positioned in region surrounded by the shielding wall 152 and limited by the bottom wall 151. The bottom wall 151 and the shielding wall 152 enclose a container-shaped surrounding region. The coil 12 and the movable member 11 are assembled at the magnetic shield cover 15 and at least partially positioned in the surrounding region. Convenience for mounting is ensured. The bottom wall 151 is configured to limit mounting positions of the coil 12 and the movable member 11 to achieve high accuracy of magnetized regions of the coil 12 and the movable member 11, and thus ensure that the movable member 11 may control the expansion and contraction of the output end according to the change in the magnetic field with high control accuracy.

The screen component disclosed in the abovementioned embodiments can be applied to a mobile terminal to enable the mobile terminal to output sound information through the screen component, avoid formation of a structure such as a sound outlet in the mobile terminal and achieve attractive overall appearance. In some embodiments of the present disclosure, the mobile terminal includes a processor and a memory configured to store a processor executable instruction. The mobile terminal further includes the screen component disclosed in the abovementioned embodiments. The coil 12 is in communication connection with the processor. The coil 12 may control a change in a magnetic field according to a change of a corresponding audio signal. The movable member 11 converts the change in the magnetic field into a driving force for driving a screen body 20 to generate sound. Energy conversion efficiency is high, and sound quality of a low frequency band is high.

As shown in FIG. 5 and FIG. 6, in some embodiments of the present disclosure, the mobile terminal further includes a middle frame component 30, and the screen body 20 and a vibration assembly 10 are detachably connected to the middle frame component 30. Specifically, a magnetic shield cover 15 is fixed to the middle frame component 30 and positioned in a region enclosed by the middle frame component 30. The screen body 20 closes an opening of the middle frame component 30 and is in contact with the vibration assembly 10. An expansion and contraction generated by the movable member 11 under the effect of the magnetic field of the coil 12 is directly transmitted to the screen body 20, so that high electromagnetic efficiency and low loss are ensured. In some embodiments of the present disclosure, the screen body 20 is glued to the middle frame component 30 through an adhesive. The adhesive has no compression or a preset compression, so that a fitting position between the screen body 20 and the middle frame component 30 is controllable, and the dimensional controllability of an expansion and contraction of the vibration assembly 10 is improved.

Figure 7:
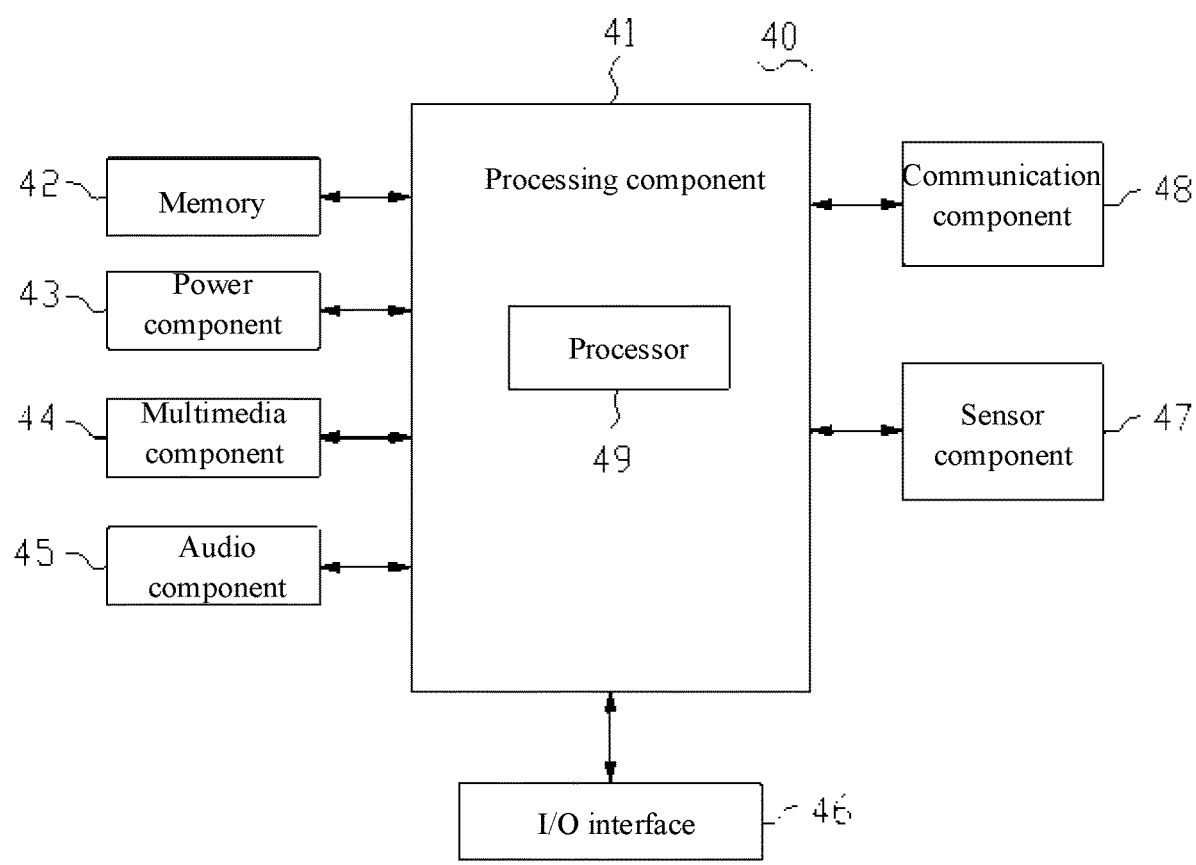
FIG. 7 is a schematic block diagram of a mobile terminal, according to some embodiments of the present disclosure.

As shown in FIG. 7, the mobile terminal may be different electronic devices. For example, the mobile terminal 40 may be a mobile phone, a computer, a digital broadcast terminal, a messaging device, a gaming console, a tablet, a medical device, exercise equipment, a personal digital assistant, a translator and the like.

The mobile terminal 40 can include one or more of the following components: a processing component 41, a memory 42, a power component 43, a multimedia component 44, an audio component 45, an I/O interface 46, a sensor component 47, and a communication component 48.

The processing component 41 typically controls overall operations of the mobile terminal 40, such as the operations associated with display, telephone calls, data communications, camera operations, and recording operations. The processing component 41 can include one or more processors 49 to execute instructions to perform all or part of the steps in the abovementioned method. Moreover, the processing component 41 can include one or more portions which facilitate interaction between the processing component 41 and the other components. For instance, the processing component 41 can include a multimedia portion to facilitate interaction between the multimedia component 44 and the processing component 41.

The memory 42 is configured to store various types of data to support the operation of the mobile terminal 40. Examples of such data include instructions for any application programs or methods operated on the mobile terminal 40, contact data, phonebook data, messages, pictures, video, etc. The memory 42 may be implemented by any type of volatile or non-volatile memory devices, or a combination thereof, such as an Electrically Erasable Programmable Read-Only Memory (EEPROM) 42, an Erasable Programmable Read-Only Memory (EPROM) 42, a Programmable Read-Only Memory (PROM) 42, a Read-Only Memory (ROM) 42, a magnetic memory 42, a flash memory 42, and a magnetic or optical disk.

The power component 43 provides power for various components of the mobile terminal 40. The power component 43 can include a power management system, one or more power supplies, and other components associated with generation, management and distribution of power for the mobile terminal 40.

The multimedia component 44 includes a screen providing an output interface between the mobile terminal 40 and a user. In some embodiments of the present disclosure, the screen can include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments of the present disclosure, the multimedia component 44 includes a front camera and/or a rear camera. The front camera and/or the rear camera may receive external multimedia data when the mobile terminal 40 is in an operation mode, such as a photographing mode or a video mode. Each of the front camera and the rear camera may be a fixed optical lens system or have focusing and optical zooming capabilities.

The audio component 45 is configured to output and/or input an audio signal. For example, the audio component 45 includes a Microphone (MIC), and the MIC is configured to receive an external audio signal when the mobile terminal 40 is in the operation mode, such as a call mode, a recording mode and a voice recognition mode. The received audio signal may further be stored in the memory 42 or sent through the communication component 48. In some embodiments of the present disclosure, the audio component 45 further includes a speaker configured to output the audio signal.

The I/O interface 46 provides an interface between the processing component 41 and a peripheral interface portion, and the peripheral interface portion may be a keyboard, a click wheel, a button and the like. The button can include, but not limited to: a home button, a volume button, a starting button and a locking button.

The sensor component 47 includes one or more sensors configured to provide status assessment in various aspects for the mobile terminal 40. For instance, the sensor component 47 may detect an on/off status of the device and relative positioning of components, such as a display and small keyboard of the mobile terminal 40, and the sensor component 47 may further detect a change in a position of the mobile terminal 40 or a component of the mobile terminal 40, presence or absence of contact between the user and the mobile terminal 40, orientation or acceleration/deceleration of the mobile terminal 40 and a change in temperature of the mobile terminal 40. The sensor component 47 can include a proximity sensor configured to detect presence of an object nearby without any physical contact. The sensor component 47 may also include a light sensor, such as a Complementary Metal Oxide Semiconductor (CMOS) or Charge Coupled Device (CCD) image sensor, configured for use in an imaging application. In some embodiments of the present disclosure, the sensor component 47 may also include an acceleration sensor, a gyroscope sensor, a magnetic sensor, a pressure sensor or a temperature sensor.

The communication component 48 is configured to facilitate wired or wireless communication between the mobile terminal 40 and other equipment. The mobile terminal 40 may access a communication-standard-based wireless network, such as Wireless Fidelity (Wi-Fi), $2^{nd}$-Generation (2G), $3^{rd}$-Generation (3G), $4^{th}$-Generation (4G), or $5^{th}$-Generation (5G) or a combination thereof. In some embodiments of the present disclosure, the communication component 48 receives a broadcast signal or broadcast associated information from an external broadcast management system through a broadcast channel. In some embodiments of the present disclosure, the communication component 48 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the mobile terminal 40 may be implemented by one or more Application Specific Integrated Circuits (ASICs), Digital Signal Processors (DSPs) 49, Digital Signal Processing Devices (DSPDs), Programmable Logic Devices (PLDs), Field Programmable Gate Arrays (FPGAs), controllers, micro-controllers, microprocessors 49 or other electronic components, and is configured to execute the abovementioned method.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:
1. A screen component, comprising:
a screen body; and
a vibration assembly;
wherein the vibration assembly comprises:
 a movable member including a giant magnetostrictive material; and
 at least one coil surrounding the movable member;
 wherein a portion of the movable member is in contact with the screen body;
wherein
the at least one coil is configured to generate a magnetic field upon with an input current;
the movable member is configured deform under effect of the magnetic field;

the magnetic field is configured to change according to a change in one or more parameters of the input current;

a deformation amount of the movable member is configured to vary according to the magnetic field, to drive the screen body to vibrate to output corresponding sound information by the screen component;

the vibration assembly further comprises a magnetic shield cover arranged to encircle the coil, the magnetic shield cover is configured to limit a relative position between the movable member and the screen body, and one end of the movable member extends beyond the magnetic shield cover.

2. The screen component of claim 1, wherein a deformation direction of the movable member is at a preset angle with respect to the screen body.

3. The screen component of claim 2, wherein a deformation direction of the movable member is perpendicular to the screen body.

4. The screen component of claim 1, wherein the movable member is positioned at a center of the coil.

5. The screen component of claim 1, wherein the vibration assembly comprises a conduction member mounted at an output end of the movable member, and the conduction member is in contact with the screen body and configured to thrust the screen body to be elastically deformed.

6. The screen component of claim 5, wherein a contact area of the conduction member and the screen body is larger than an area of the output end of the movable member.

7. The screen component of claim 5, wherein the conduction member is in a form of a plate structure, and the movable member is connected to a center of the conduction member.

8. The screen component of claim 5, wherein the conduction member is glued to the movable member.

9. The screen component of claim 5, wherein the conduction member is in a form of a thin-walled structure and configured to be gradually elastically deformed from the center to the periphery; and wherein the movable member has a pillar structure.

10. The screen component of claim 1, wherein the magnetic shield cover comprises a bottom wall and a shielding wall surrounding the bottom wall, the coil and the movable member are positioned in a region surrounded by the shielding wall, and are limited by the bottom wall.

11. The screen component of claim 1, wherein the screen body is provided with multiple vibration assemblies spaced from each other.

12. A mobile phone comprising the screen component of claim 1, further comprising:
a middle frame component; and
an audio circuit;
wherein
the movable member is configured to approximately linearly deform under the effect of the magnetic field;
the vibration assembly is in direct contact with the screen body and configured to directly act on the screen body and synchronously vibrate with a current signal output by the audio circuit portion; and
the screen body and the vibration assembly are detachably coupled to the middle frame component.

13. A screen component, comprising:
a screen body; and
a vibration assembly;
wherein the vibration assembly comprises:
a movable member including a giant magnetostrictive material; and
at least one coil surrounding the movable member;
wherein a portion of the movable member is in contact with the screen body;
wherein
the at least one coil is configured to generate a magnetic field upon with an input current;
the movable member is configured deform under effect of the magnetic field;
the magnetic field is configured to change according to a change in one or more parameters of the input current;
a deformation amount of the movable member is configured to vary according to the magnetic field, to drive the screen body to vibrate to output corresponding sound information by the screen component;
wherein the vibration assembly comprises a conduction member mounted at an output end of the movable member, and the conduction member is in contact with the screen body and configured to thrust the screen body to be elastically deformed;
wherein the vibration assembly further comprises a protective cover fixedly connected to the conduction member, and the protective cover is arranged to cover the movable member.

14. The screen component of claim 13, wherein the protective cover is detachably connected with the conduction member; or, the protective cover is integrally formed with the conduction member.

15. The screen component of claim 13, wherein the protective cover comprises a limiting portion and a collar portion surrounding the limiting portion, and the movable member abuts against the limiting portion and is limited in a region surrounded by the collar portion.

16. The screen component of claim 13, wherein at least a part of the protective cover is inserted into a region enclosed by the coil and spaced from the coil by a preset distance.

17. The screen component of claim 13, wherein there is a preset pressure between the protective cover and the movable member.

18. A mobile terminal, comprising:
a processor; and
memory configured to store a processor-executable instruction,
wherein the mobile terminal further comprises a screen component including:
a screen body; and
a vibration assembly;
wherein the vibration assembly comprises:
a movable member including a giant magnetostrictive material; and
at least one coil surrounding the movable member;
wherein a portion of the movable member is in contact with the screen body;
wherein
the at least one coil is configured to generate a magnetic field upon with an input current;
the movable member is configured deform under effect of the magnetic field;
the magnetic field is configured to change according to a change in one or more parameters of the input current;
a deformation amount of the movable member is configured to vary according to the magnetic field, to drive the screen body to vibrate to output corresponding sound information by the screen component;
the or each vibration assembly further comprises a magnetic shield cover arranged to encircle the coil, the magnetic shield cover is configured to limit a relative position between the movable member and the screen body, one end of the movable member extends beyond the magnetic shield cover; and the coil is in communication connection with the processor.

19. The mobile terminal of claim 18, further comprising a middle frame component, wherein the screen body and the vibration assembly are detachably connected to the middle frame component.

\* \* \* \* \*